United States Patent
Ruisi et al.

(10) Patent No.: US 10,941,073 B2
(45) Date of Patent: Mar. 9, 2021

(54) METHOD FOR MANUFACTURING SELF-ADHESIVE MINERAL WOOL PADS

(71) Applicant: SAINT-GOBAIN ISOVER, Courbevoie (FR)

(72) Inventors: Fabrice Ruisi, Dracy-le-Fort (FR); Vincent Hoffmann, Puteaux (FR); Michel Janas, Rasteau (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 194 days.

(21) Appl. No.: 16/085,801

(22) PCT Filed: Mar. 14, 2017

(86) PCT No.: PCT/FR2017/050572
§ 371 (c)(1),
(2) Date: Sep. 17, 2018

(87) PCT Pub. No.: WO2017/162955
PCT Pub. Date: Sep. 28, 2017

(65) Prior Publication Data
US 2019/0100458 A1 Apr. 4, 2019

(30) Foreign Application Priority Data

Mar. 24, 2016 (FR) ...................................... 1652569

(51) Int. Cl.
| | | |
|---|---|---|
| *C03C 25/143* | (2018.01) | |
| *C03C 25/34* | (2006.01) | |
| *C03B 37/04* | (2006.01) | |
| *B32B 5/26* | (2006.01) | |
| *B32B 7/10* | (2006.01) | |
| *B32B 19/06* | (2006.01) | |
| *C03C 25/14* | (2018.01) | |
| *B32B 5/02* | (2006.01) | |
| *B32B 27/42* | (2006.01) | |
| *B32B 27/12* | (2006.01) | |
| *B32B 27/30* | (2006.01) | |
| *B32B 7/04* | (2019.01) | |
| *B32B 27/36* | (2006.01) | |

(52) U.S. Cl.
CPC ............ *C03C 25/143* (2013.01); *B32B 5/022* (2013.01); *B32B 5/26* (2013.01); *B32B 7/04* (2013.01); *B32B 7/10* (2013.01); *B32B 19/06* (2013.01); *B32B 27/12* (2013.01); *B32B 27/308* (2013.01); *B32B 27/36* (2013.01); *B32B 27/42* (2013.01); *C03C 25/14* (2013.01); *C03C 25/34* (2013.01); *B32B 2260/021* (2013.01); *B32B 2260/023* (2013.01); *B32B 2260/046* (2013.01); *B32B 2262/0276* (2013.01); *B32B 2262/101* (2013.01); *B32B 2262/108* (2013.01); *B32B 2307/304* (2013.01); *B32B 2307/3065* (2013.01); *B32B 2307/718* (2013.01); *B32B 2307/732* (2013.01); *B32B 2405/00* (2013.01); *B32B 2471/04* (2013.01); *C03B 37/04* (2013.01)

(58) Field of Classification Search
None
See application file for complete search history.

(56) References Cited

U.S. PATENT DOCUMENTS

| | | | | |
|---|---|---|---|---|
| 5,065,478 A | * | 11/1991 | Furtak | .................. D04H 1/4209 19/296 |
| 2005/0153616 A1 | * | 7/2005 | Suda | .......................... B32B 5/24 442/327 |
| 2005/0166543 A1 | * | 8/2005 | Suda | .......................... E04B 1/00 52/782.1 |
| 2007/0012414 A1 | * | 1/2007 | Kajander | ............... D21H 27/30 162/129 |
| 2009/0311934 A1 | | 12/2009 | Carpanedo et al. | |
| 2015/0298449 A1 | | 10/2015 | Nielsen et al. | |
| 2017/0022398 A1 | * | 1/2017 | Lochel, Jr. | ................. C08L 3/02 |
| 2017/0210094 A1 | * | 7/2017 | Hoshino | .................. B32B 37/10 |

FOREIGN PATENT DOCUMENTS

| | | |
|---|---|---|
| WO | WO 00/57101 A1 | 9/2000 |
| WO | WO 03/012220 A1 | 2/2003 |
| WO | WO 2006/061540 A1 | 6/2006 |
| WO | WO 2014/090670 A1 | 6/2014 |

OTHER PUBLICATIONS

International Search Report dated May 15, 2017 in PCT/FR2017/050572 filed Mar. 14, 2017.

* cited by examiner

*Primary Examiner* — Lisa L Herring
(74) *Attorney, Agent, or Firm* — Oblon, McClelland, Maier & Neustadt, L.L.P.

(57) ABSTRACT

A process for manufacturing self-adhesive insulation products based on mineral wool includes (a) forming mineral fibers by centrifugation of molten glass or rock, (b) spraying, over the mineral fibers, immediately after the forming, a first liquid organic binder composition, (c) forming a blanket of mineral fibers which are coated with the first liquid organic binder composition, (d) covering a face of the blanket with a surfacing mat of glass or organic fibers having high heat resistance, (e) heating the blanket, covered with the surfacing mat, in a drying oven for a period of time and at a temperature sufficient to cure the organic binder, and (f) applying, to the exposed face of the surfacing mat, a self-adhesive material. A second liquid organic binder composition is applied, after stage (c), to the mat and/or face of the blanket which is intended to come into contact with the surfacing mat.

13 Claims, No Drawings

METHOD FOR MANUFACTURING SELF-ADHESIVE MINERAL WOOL PADS

The present invention relates to self-adhesive insulation products based on mineral wool and to a process for manufacturing them.

The manufacture of insulation products based on mineral wool comprises a stage of forming the glass or rock fibers respectively by internal or external centrifugation. At the outlet of the centrifugation device, the very hot and still plastic fibers are drawn and carried away by a gas stream. Subsequently, a binding composition, also known as binder, is sprayed over the still warm fibers. The sized fibers are subsequently collected and flattened in the form of a blanket on a collecting belt or conveyor, which passes into a drying oven where the binder is dried and cured by heating at temperatures of approximately 200° C.

The conveyor is generally a gas-permeable metal belt, for example a metal screen. A suction device may be provided below the conveyor.

As a result of this method of formation of the blanket of fibers, the fibers do not have a random orientation but a preferential orientation parallel to the general plane of the flat product formed. The mechanical properties of the product, such as the tensile strength or the post-compression thickness recovery, depend essentially on the nature and on the quantity of the cured organic binder which binds the fibers together. For obvious reasons of limiting the costs and of optimization of the resistance to fire of the products, the content of organic binder is as low as possible, generally of the order of 3-7% by weight.

Insulation products based on mineral wool can additionally comprise a facing, typically kraft paper, a surfacing mat or an aluminum sheet, glued to one or both faces of the mineral wool blanket. The facing is typically positioned on the blanket of sized mineral fibers before entry into the drying oven or at the drying oven outlet for the facings which do not withstand the temperature, such as kraft paper or certain colored facings.

When the applicant company attempted to render one of the faces of such an insulation product adhesive, by application of an adhesive composition directly to the surface of the blanket of fibers or to a facing of paper or surfacing mat type, it was confronted with the following problem: the product, glued with its adhesive face to a vertical support, such as a wall, did not remain in place. The mineral wool blanket became detached from the wall and from the adhesive layer, which itself was still firmly attached to the vertical support. Cohesive failure could be observed within the mineral wool between the surface layers or plies of the blanket of fibers and the adhesive layer closest to the substrate, while the layers or plies of the blanket located below fell under the effect of their own weight.

Several solutions had already been proposed for overcoming this lack of cohesion:
  encasing the blanket of fibers and using the casing as facing element rendered adhesive by application of a self-adhesive arrangement, such as a double-sided adhesive film or adhesive tape or glue,
  cutting and positioning the mineral wool fibers along an orientation perpendicular to the plane of the adhesive layer: the fibers are thus anchored in depth in the thickness of the blanket and are not easily torn out; the Isover Climcover Lamella Fix product of the applicant company may be mentioned by way of example of such a product;
  meshing in the thickness of the product: a network of yarns provides the bonding between two facings; the Isover Climaver 504 product of the applicant company, in its self-adhesive version, corresponds to this type of product.

The encasing exhibits the disadvantage of preventing the product from being cut up after manufacture. The final two solutions require complex industrial processes and may prove to be impossible to carry out for thick products.

Of course, the applicant company would have been able to overcome the problem of the surface fibers being torn out by improving the intrinsic strength of the mineral wool blanket, that is to say by simply increasing the content of organic binder of the product until the network of glued fibers is sufficiently robust. However, in the field of insulation products based on mineral wool, such a practice is unsatisfactory because it would harm the mechanical properties of the product, would undesirably lessen the reaction to fire of the products and would increase the production costs.

It is thus an aim of the present invention to provide a process for the manufacture of insulation products based on mineral wool, at least one face of which is self-adhesive, which, when they are glued to a substrate (for example a vertical wall or a ceiling), do not exhibit cohesive failure under the effect of their own weight. The problem of the lack of cohesion observed in the surface layer of the blanket has to be overcome without the overall binder content of the insulation product being significantly increased. In other words, the binder content of the product has to be substantially identical to that of the equivalent nonadhesive products available on the market, typically between 1% and 10%, preferably between 2% and 7%, by weight of dry binder, with respect to the total weight of the blanket.

After numerous attempts, the applicant company has developed a relatively simple process for the manufacture of insulation products, not very different from the known process, which makes it possible to overcome the problem of the cohesive failure without significantly increasing the overall organic binder content of the insulation product. In the process of the present invention, the solution to the problem described above consists in increasing the binder content of the blanket of glass fibers solely in the region of brittleness observed, that is to say the closest layer to the interfacing. The additional amount of applied organic binder thus selectively reinforces the cohesion of the external layer of the blanket and effectively prevents failure. However, the amount of additional binder (sometimes referred to below as "supersizing") is sufficiently low not to modify the resistance to fire of the product.

There exist several ways of introducing an excess of organic binder solely into the surface layer of the mineral wool blanket.

The first consists in impregnating an interfacing product, such as a surfacing mat or a mat of organic fibers having high heat resistance, with a binder composition and in positioning this mat, impregnated with liquid composition, over the mineral wool blanket before entering the drying oven, that is to say at a stage where the binder of the blanket is not yet polymerized. The excess binder introduced by the mat will seep, under the effect of gravity, into the layer of fibers immediately in contact with the interfacing. An excess content of binder is formed locally which will reinforce the bonds of the layers to be brought into contact with the self-adhesive arrangement. In the drying oven, the additional binder cures and, if appropriate, reacts with the binder composition, not yet already cured, on the fibers and a sufficiently robust connection is formed.

Another way of locally introducing an additional amount of binder at the surface of the blanket is to homogeneously sprinkle the top of the blanket of fibers with a liquid binder composition before applying the interfacing and to cure the blanket/interfacing assembly in the drying oven. These two methods of introducing binder (application to the interfacing, application to the blanket) can, of course, be combined.

The applicant company has observed, with satisfaction and with a degree of surprise, that, by proceeding in the way described above, that is to say by locally introducing an additional amount of binder, the final self-adhesive insulation product exhibited a satisfactory cohesiveness; the region of brittleness had disappeared and was not simply displaced toward greater depths of the blanket, as might have been thought a priori.

A first subject matter of the present invention is thus a process for the manufacture of self-adhesive insulation products based on mineral wool, said process comprising, in order, the following successive stages:
(a) the forming of mineral fibers by centrifugation of molten glass or of molten rock,
(b) the spraying, over the mineral fibers, immediately after they have been formed, of a first liquid organic binder composition,
(c) the formation of a blanket of mineral fibers which are coated with the first liquid organic binder composition, by deposition on a conveyor,
(d) the covering of a face of the blanket of mineral fibers with a surfacing mat of glass fibers or of organic fibers having high heat resistance,
(e) the heating of the blanket of mineral fibers, covered with the surfacing mat of glass fibers or of organic fibers having high heat resistance, in a drying oven for a period of time and at a temperature sufficient to cure the organic binder,
said process being characterized in that a second liquid organic binder composition is applied to the mat and/or to the face of the blanket of mineral fibers which is intended to come into contact with the mat, the second liquid organic binder composition preferably containing components capable of reacting with the components of the first liquid organic binder composition, the application of the second liquid binder composition being carried out after stage (c) of formation of the blanket and, preferably, before stage (d) of covering the blanket with the surfacing mat.

The organic binder used to bind together the mineral fibers can be any known crosslinkable polymer system used for this purpose. Mention may be made, by way of example, of resins based on phenol and formaldehyde, resins based on phenol, urea and formaldehyde, resins based on phenol, urea, amine and formaldehyde, acrylic polymers, polyesters obtained by polycondensations of monomers and/or oligomers having acid and hydroxyl functional groups, for example of carbohydrates and of citric acid, or the products resulting from the Maillard reaction between a reducing sugar and an amine. Use will advantageously be made of binder compositions containing a resin based on phenol, amine and formaldehyde, having a reduced formaldehyde content, such as are described in the application WO 2008/043960.

The first liquid organic binder composition, sprayed over the fibers immediately after exiting from the centrifugation device and before formation of the blanket, is not necessarily identical to the second liquid organic binder composition applied locally to a face of the blanket and/or to the surfacing mat. However, it is essential for the reactive components of the two compositions to be compatible with one another in order to produce a homogeneous or mixed or interpenetrated polymer matrix. Preferably, the reactive components of the two compositions can react together and can form covalent bonds.

In a preferred embodiment of the process of the invention, the second liquid organic binder composition essentially contains the same reactive components as the first liquid organic binder composition. However, the second liquid binder composition may be more concentrated or less concentrated than the first. In addition, it may be devoid of certain sizing adjuvants present in the first liquid organic binder composition.

The first and the second liquid organic binder compositions are preferably water-based compositions.

It is possible, in principle, to use, as interfacing, any surfacing mat or mat of organic fibers having high heat resistance available on the market which is compatible with the use envisaged for the finished product. It is preferably a nonwoven surfacing mat or a mat of polyester fibers, such as described in WO 2006/061540. Use will preferably be made of a surfacing mat.

Before being impregnated with the second liquid organic binder composition, the surfacing mat of glass fibers or of organic fibers having high heat resistance advantageously has a weight per unit area of between 20 and 100 $g/m^2$, preferably between 30 and 90 $g/m^2$ and in particular between 35 and 80 $g/m^2$.

Its organic binder content, before supersizing, is preferably between 10% and 25%, preferably between 11% and 20%, by weight.

In a preferred embodiment of the process of the present invention, the second binder composition is applied to the surfacing mat. This application can be carried out, for example, by spraying the second binder composition by means of nozzles, by immersion of the mat in the second binder composition or also by coating by means of a "lick-roll" applicator, that is to say of a rotating cylinder which is in contact both with the second binder composition and with the surfacing mat.

This third method of application is preferred as it makes possible both easy control of the amount of composition transferred onto the mat and the use of a second binder composition which is significantly more viscous than the first.

The second liquid organic binder composition advantageously has a solids content of between 100 g/liter and 400 g/liter, preferably between 120 g/liter and 300 g/liter, in particular between 150 g/liter and 200 g/liter.

It must, on the one hand, be sufficiently fluid to flow along the mineral fibers in the surface layer of the blanket of fibers and, on the other hand, be viscous enough for the increase in the cohesion due to the supersizing to be sufficient.

The solids content and the total amount of the second liquid organic binder composition applied to the surfacing mat and/or to the face of the blanket of mineral fibers which is intended to come into contact with the surfacing mat, are such that the contribution of organic binder solids is between 2 $g/m^2$ and 50 $g/m^2$, preferably between 3 and 30 $g/m^2$ and in particular between 4 and 25 $g/m^2$ of finished product.

After bringing the surfacing mat of glass fibers or of organic fibers having high heat resistance into contact with the blanket of mineral fibers, the as yet uncured product is advantageously subjected to the action of a stream of air or of a vertically moving conveyor applying a mechanical compressive stress. This stream of air, which can, for example, be created by a suction system located under the conveyor, promotes the flow and the spreading in uniform fashion of the second binder composition in the surface layer of the blanket of mineral fibers.

The stage of heating the blanket of mineral fibers, covered with the mat, in a drying oven does not exhibit a distinctive feature and can be carried out in a known way at a temperature of, for example, between 180° C. and 240° C., preferably between 200° C. and 220° C., for a period of time of between 30 seconds and 4 minutes.

The temperature and the duration of heating should, of course, be adjusted as a function of the chemical nature of the organic binder used so as to guarantee a curing which is as complete as possible while limiting possible thermal degradation of the cured binder.

The intermediate insulation product obtained at the outlet of the drying oven is subsequently rendered self-adhesive. For this, a "self-adhesive material" is applied to the exposed face of the surfacing mat. This term encompasses any means, attached to the surfacing mat, which makes it possible to glue the insulation product to a support, generally a flat support, by simply bringing into contact.

In one embodiment, the self-adhesive material is a double-sided adhesive sheet, for example a structure based on fibers (nonwoven or paper) or a polymer film, comprising, on each of its faces, a continuous or noncontinuous layer of a pressure-sensitive adhesive (PSA).

In another embodiment, the self-adhesive material is a pressure-sensitive adhesive (PSA).

Pressure-sensitive adhesives (PSAs) are adhesives generally present in the form of a thin layer carried by a support. They glue virtually immediately, by simple contact and application of a pressure, to the material to be glued. Although there exist some PSAs having a very high adhesiveness, the very great majority of PSAs are regarded as nonstructural or semistructural adhesives, that is to say the gluing is reversible. The glass transition temperature of PSAs is always significantly lower than the temperature of use envisaged. At ambient temperature, the polymer network forming the adhesive layer is thus a viscoelastic fluid, this being because the high mobility of the polymer chains is a condition essential to the formation of a multitude of weak bonds (van der Waals and hydrogen bonds) between the adhesive and the surface to be glued.

PSAs are generally characterized by their tack, their peel strength and their shear strength.

Three main chemical classes of pressure-sensitive adhesives are typically distinguished:
  PSAs based on elastomers,
  acrylic PSAs and
  PSAs based on silicone.

The PSAs used in the present invention are preferably acrylic PSAs.

In a second embodiment of the process of the invention, a PSA is applied directly to the surfacing mat of the intermediate insulation product. The manufacturing process according to the invention thus preferably comprises, after the heating stage (e), a stage (f) of application of a pressure-sensitive adhesive to the exposed face of the surfacing mat. This PSA is preferably an acrylic adhesive.

This stage advantageously comprises the spraying of an aqueous solution or dispersion of the adhesive and the drying and/or the curing of the adhesive layer deposited, optionally with a contribution of energy by heating and/or irradiation.

The amount of PSA, expressed as solids, applied to the exposed face of the surfacing mat is advantageously between 10 and 50 g/m$^2$, preferably between 12 and 40 g/m$^2$, in particular between 15 and 30 g/m$^2$.

It can also be envisaged to apply the PSA to the surfacing mat by projecting a powder of a hot-melt PSA and heating.

The PSA layer applied to the exposed face of the surfacing mat is not necessarily a continuous layer. It can be a non-continuous layer formed of a combination of adhesive regions, for example in the form of strips or islands, and of non-adhesive regions.

Such a non-continuous adhesive layer can be deposited, for example, by printing a PSA-based adhesive composition.

A peelable protective polymer film can subsequently be applied in a known way to the adhesive layer.

An additional subject matter of the present invention is a self-adhesive insulation product based on mineral wool obtained by the process described above.

The self-adhesive insulation product based on mineral wool of the present invention comprises:
  a blanket of mineral wool formed of mineral fibers bonded together by an insoluble cured organic binder, it being possible for this blanket of mineral wool to be with or without coating on the side opposite the one where the self-adhesive is applied,
  on one of the faces of the blanket, a surfacing mat of glass fibers or of organic fibers having high heat resistance which is bonded to the blanket by an insoluble cured organic binder, and
  a layer of a pressure-sensitive adhesive (PSA) on the side of the exposed face of the surfacing mat,
and it is characterized in that the content of organic binder in the surface layer of the mineral wool blanket which is in contact with the surfacing mat is significantly greater than the content of organic binder in the remainder of the mineral wool blanket.

"Surface layer" is understood here to mean a layer representing approximately 10% by weight of the mineral wool blanket (without the surfacing mat) and "the remainder of the mineral wool blanket" is understood here to mean the complementary part up to 100% by weight of the blanket.

The organic binder content of the remainder of the mineral wool blanket is due solely to the first liquid binder composition. It is comparable in the present patent application to the content of combustible materials determined in accordance with the standard EN ISO 1887. This content of combustible materials (loss on ignition, LOI) is in principle substantially the same throughout the thickness of the blanket, except for the surface layer, where the content of organic binder due to the supersizing, that is to say to the contribution of organic binder by the second liquid organic binder composition, is also found.

The difference between the content of organic binder in the surface layer ($LOI_{10}$) and the organic binder content of the remainder of the blanket ($LOI_{90}$) preferably corresponds to amount of applied organic binder (Q) of between 2 g/m$^2$ and 50 g/m$^2$, in particular between 3 and 30 g/m$^2$ and ideally between 4 and 25 g/m$^2$ of insulation product.

The supersizing, or amount of organic binder applied by the second liquid organic binder composition, can be determined in the following way:
  A sample with a surface area (S) (at least equal to 0.5 m$^2$) is cut out from the finished product. The glued surfacing mat is separated from the mineral wool blanket using an appropriate cutting tool, taking care to separate the fewest possible mineral fibers from the blanket.
  The total weight ($W_T$) of the sample of surface area S, freed from the mat, is determined. A surface layer (previously in contact with the mat), corresponding to approximately 10% by weight of the sample, is then separated from the remainder of the blanket, corresponding to approximately 90% by weight of the blanket, using an appropriate cutting tool. The weight ($W_{10}$) of the surface layer and the weight ($W_{90}$) of the remainder of the blanket are accurately determined.

The content of combustible materials ($LOI_{10}$ and $LOI_{90}$) of the two respective parts of weight $W_{10}$ and $W_{90}$ are determined in accordance with the standard EN ISO 1887: 2014.

As a result of the additional amount of binder applied by the second liquid organic binder composition, the $LOI_{10}$ (expressed in %) of the surface layer of weight $W_{10}$ (expressed in g) will be greater than the $LOI_{90}$ (expressed in %) of the remainder of the blanket of weight $W_{90}$ (expressed in g).

The supersizing, that is to say the additional amount (Q) of binder applied by the second organic binder composition (expressed in g), can be calculated in the following way:

$$Q = (LOI_{10} - LOI_{90}) \times W_{10}$$

This value can subsequently be expressed in g per unit of surface area S (expressed in $m^2$) of finished product.

Although the process according to the invention can be used in principle to manufacture any type of self-adhesive insulation product based on mineral wool, the technical problem at the basis of the present invention is posed more crucially for the products exhibiting both a fairly low density and a high thickness. Very dense and compact products, on the one hand, and very thin products, on the other hand, are not very liable to exhibit cohesive failure as described in the introduction.

The self-adhesive insulation products based on mineral wool of the present invention consequently advantageously exhibit a density, determined in accordance with the standard NF EN 823, of between 10 $kg/m^3$ and 100 $kg/m^3$, preferably between 15 $kg/m^3$ and 80 $kg/m^3$, in particular between 20 $kg/m^3$ and 70 $kg/m^3$.

Their thickness, determined in accordance with the standard NF EN 823, is advantageously between 15 mm and 200 mm, preferably between 30 mm and 150 mm, in particular between 50 mm and 120 mm.

The invention claimed is:

1. A process for manufacturing self-adhesive insulation products based on mineral wool, comprising:
   (a) forming mineral fibers by centrifugation of molten glass or of molten rock,
   (b) spraying, over the mineral fibers, immediately after the mineral fibers have been formed, a first liquid organic binder composition,
   (c) forming a blanket of mineral fibers which are coated with the first liquid organic binder composition, by deposition on a conveyor,
   (d) covering a face of the blanket of mineral fibers with a surfacing mat of glass fibers or of organic fibers having heat resistance,
   (e) heating the blanket of mineral fibers, covered with the surfacing mat, in a drying oven for a period of time and at a temperature sufficient to cure the first liquid organic binder composition,
   (f) applying, to an exposed face of the surfacing mat, a pressure-sensitive adhesive (PSA),
   wherein, after stage (c), a second liquid organic binder composition is applied to the surfacing mat and/or to the face of the blanket of mineral fibers which is intended to come into contact with the surfacing mat.

2. The process as claimed in claim 1, wherein the second liquid organic binder composition essentially contains the same reactive components as the first liquid organic binder composition.

3. The process as claimed in claim 1, wherein the PSA is an acrylic adhesive.

4. The process as claimed in claim 1, wherein the PSA is applied to the exposed face of the surfacing mat in an amount of between 10 and 50 $g/m^2$.

5. The process as claimed in claim 1, wherein the surfacing mat exhibits, before application of the second liquid organic binder composition, a weight per unit area of between 20 and 100 $g/m^2$.

6. The process as claimed in claim 1, wherein the second liquid organic binder composition has a solids content of between 100 g/liter and 400 g/liter.

7. The process as claimed in claim 1, wherein a solids content of the second liquid organic binder composition and its total amount applied to the surfacing mat and/or to the face of the blanket of mineral fibers which is intended to come into contact with the surfacing mat, are such that the amount of applied organic binder solids is between 2 $g/m^2$ and 50 $g/m^2$ of insulation product.

8. The process as claimed in claim 1, wherein the second liquid organic binder composition is applied to the surfacing mat and/or to the face of the blanket of mineral fibers before stage (d).

9. The process as claimed in claim 1, wherein the second liquid organic binder composition contains components capable of reacting with the components of the first liquid organic binder composition.

10. The process as claimed in claim 1, wherein the PSA is applied to the exposed face of the surfacing mat in the amount of between 15 and 30 $g/m^2$.

11. The process as claimed in claim 1, wherein the weight per unit area of the surfacing mat, before the application of the second liquid organic binder composition, is between 35 and 80 $g/m^2$.

12. A process for manufacturing self-adhesive insulation products based on mineral wool, comprising:
   (a) forming mineral fibers by centrifugation of molten glass or of molten rock,
   (b) spraying, over the mineral fibers, immediately after the mineral fibers have been formed, a first liquid organic binder composition,
   (c) forming a blanket of mineral fibers which are coated with the first liquid organic binder composition, by deposition on a conveyor,
   (d) covering a face of the blanket of mineral fibers with a surfacing mat of glass fibers or of organic fibers having heat resistance,
   (e) heating the blanket of mineral fibers, covered with the surfacing mat, in a drying oven for a period of time and at a temperature sufficient to cure the first liquid organic binder composition,
   (f) applying, to an exposed face of the surfacing mat, a self-adhesive material,
   wherein, after stage (c), a second liquid organic binder composition is applied to the surfacing mat and/or to the face of the blanket of mineral fibers which is intended to come into contact with the surfacing mat, and
   wherein the surfacing mat exhibits, before application of the second liquid organic binder composition, a weight per unit area of between 20 and 100 $g/m^2$.

13. A process for manufacturing self-adhesive insulation products based on mineral wool, comprising:

(a) forming mineral fibers by centrifugation of molten glass or of molten rock,
(b) spraying, over the mineral fibers, immediately after the mineral fibers have been formed, a first liquid organic binder composition,
(c) forming a blanket of mineral fibers which are coated with the first liquid organic binder composition, by deposition on a conveyor,
(d) covering a face of the blanket of mineral fibers with a surfacing mat of glass fibers or of organic fibers having heat resistance,
(e) heating the blanket of mineral fibers, covered with the surfacing mat, in a drying oven for a period of time and at a temperature sufficient to cure the first liquid organic binder composition,
(f) applying, to an exposed face of the surfacing mat, a self-adhesive material,
wherein, after stage (c), a second liquid organic binder composition is applied to the surfacing mat and/or to the face of the blanket of mineral fibers which is intended to come into contact with the surfacing mat, and
wherein a solids content of the second liquid organic binder composition and its total amount applied to the surfacing mat and/or to the face of the blanket of mineral fibers which is intended to come into contact with the surfacing mat, are such that the amount of applied organic binder solids is between 2 g/m$^2$ and 50 g/m$^2$ of insulation product.

* * * * *